United States Patent [19]

Srba

[11] Patent Number: 4,942,281

[45] Date of Patent: Jul. 17, 1990

[54] MULTI-TORCH INTERFACE ASSEMBLY FOR INERT GAS WELDING

[76] Inventor: Craig F. Srba, 6837 Walnut St., Westerville, Ohio 43081

[21] Appl. No.: 389,163

[22] Filed: Aug. 3, 1989

[51] Int. Cl.[5] .............................................. B23K 9/16
[52] U.S. Cl. .................................... 219/75; 219/136; 219/137 R
[58] Field of Search .................... 219/72, 74, 75, 136, 219/137.63, 137.62, 137 R, 130.1

[56] References Cited

U.S. PATENT DOCUMENTS 3,278,721  10/1966  Roe ................................... 219/130.1
4,278,864   7/1981  DeFacci et al. ...................... 219/74

Primary Examiner—Clifford C. Shaw
Attorney, Agent, or Firm—Mueller and Smith

[57] ABSTRACT

A multi-torch interface allowing substantially immediate selection of one of a plurality of TIG welding torches. The interface may be retrofitted to an existing TIG welding system by attaching torch cables and inputs to the torches to a separate interface housing A series of valves and adapters within this housing are coupled to sources of current, inert gas, and coolant fluid and are actuated manually to allow for easy switching from one torch to another quickly and safely without tools. Alternatively, such an interface and series of valves, switches and adapters are incorporated within a TIG welding machine cabinet or power source and controlled by a ganged assemblage of switches and valves which are simultaneously actuated.

20 Claims, 4 Drawing Sheets

MULTI-TORCH INTERFACE ASSEMBLY FOR INERT GAS WELDING

BACKGROUND OF THE INVENTION

Gas tungsten arc welding, also commonly known as TIG welding, is a process that produces an arc between a non-consumable tungsten electrode and a workpiece, protected from oxidation by an inert gas shield. This welding process works especially well for relatively thin metals, such as stainless steel and aluminum, less than 0.125 inches in thickness. Although relatively slow for thicker metals, TIG welding is used for thicker welds in industries such as aircraft, aerospace, and nuclear facilities, where high quality is required. TIG welding also has an advantage over some other processes in that a welder can weld in any direction or position. A description of TIG welding and other welding procedures can be found in the *Metals Handbook*, published by the American Society for Metals, in volume 6 entitled "Welding, Brazing and Soldering".

As there are numerous combinations of metals, thicknesses, and joint geometries to weld, so there are numerous types of TIG welding torches and combinations of inputs to those torches required by the welder to match such combinations. See the *Metals Handbook*, pp 182–213, for discussion and tables relating these factors.

The torch has several important physical characteristics, particularly the size of the electrode, and its general shape and weight. For example, torches typically have electrode diameters that vary from 0.04 inches to 0.125 inches, depending on the metal, thickness, and type of weld. Depending on the electrode diameter and other factors, the nozzle around the electrode can be made from one of several materials and can be either cylindrical or tapered, certain shapes allowing the welder to use less gas. Weight of the torch typically varies from 1 ounce to 15 ounces, welders generally preferring to use as light and comfortable a torch as possible for a given job. If accessibility to a weld joint is difficult, there are torches shaped to reach various piecepart angle configurations for welding around corners or through small openings.

There are three main inputs to the torch: current, gas, and coolant. Current can be AC or DC and can range at least from 3 to 500 amps AC, depending on the torch and on the size of electrode needed. Which gas to use, for instance, argon, helium, or argon-helium is determined from the base metal composition, thickness, tungsten diameter and shape, weld joint geometry, and penetration required. These factors, in turn, determine the rate of gas flow. Coolant for the torch can be a fluid such as water or a water/anti-freeze mix. Smaller torches can be air-cooled. When using water as coolant, the water can enter the torch through its own line, either from a water circulator or from an output in the welding machine, and return through the power cable or the water can enter with the power line and return to the coolant source through a return water line. In some installations, water coolant is not recirculated, the torch being cooled from a conventional water tap outlet whereupon the water is discarded. Generally, a water type coolant is required for larger currents, thus making the torch assemblies heavier, bulkier, and less manipulative.

Welders should use a best torch configuration for a given weld-type or requirement and a variety of such weld requirements may be encountered for a given workpiece. Thus, not only is an overall weld procedure improved by using multiple torch configurations, but also costs associated with rework and rejection rates are reduced. Problems can occur when a welder attempts to save time by using only one torch for welds of different metals and thicknesses. The correct torch for a thicker metal may burn through a thinner workpiece. Conversely, the correct torch for a thinner metal workpiece may not completely penetrate the base metal while creating an appearance that the weld is sound. Welders, however, tend to start with one tool and continue to use it as long as it can somewhat perform a given job, inasmuch as switching torches is a time consuming and annoying process.

To switch torches, a welder must independently disconnect the current, the gas, and the coolant, since each line is built into the torch head. The power cable, which often includes the water suppy or water return, must be disconnected from the power block that is attached to the power supply. Usually this results in coolant spilling on the work region floor and creating a potential shock or slip hazard to the welder who may end up standing in a puddle near a power source that could accidentally be activated. If water coolant is used, the input must be disconnected either from the welding machine if city water is used, or from the water circulator. The gas line must also be disconnected from its source. Various tools are required to carryout this switch-over because the several connections are threaded, some left-handed and some right-handed. A variety of tools are called for since connections can have different adapters. The welder has to wrap the torch and the cables for storage, then obtain another torch and reconnect the various inputs and return conduits and cables. This process can often take 15 to 20 minutes. It is understandable then, that during a welding project, welders prefer to use the singular torch in their hand than to use a more properly sized and configured torch.

SUMMARY OF THE INVENTION

The present invention is addressed to an improved multi-torch assembly and inert gas welding method which permits a welder to change torches required or proper for a given project without tools quickly, easily, and safely. With this approach, switching of torches can require as little as 15 seconds, which is at least 60 times faster than by resort to the previous conventional techniques, the latter being as old as TIG welding itself, introduced to industry in the era of World War II.

In accordance with the invention, to an interface assembly is provided which can either be built into the power source, i.e. a welding cabinet, or can be provided within its own housing adjacent the power source. Any number of torches can be employed with the interface assembly. For each such torch, the interface has a receptacle for the power cable input, and valves to redirect the flow of gas and coolant. Within the interface assembly are assembled a series of valves, fittings, connectors, and adapters meeting specifications required for the TIG welding process.

As another benefit of the invention, a welder can construct a mechanized welding system for a particular contract, then switch to another torch for a manual weld without disturbing the mechanized set-up. The interface approach of the invention may be adapted for other welding processes, such as plasma arc welding (PAW) or plasma arc cutting (PAC).

As another feature, the invention is concerned with an improved multi-torch interface assembly utilized within an inert gas welding system of a variety wherein welding torches of varying configuration are removably connectable by an elongate cable with a control current source located within the cabinet, and are connectable by elongate inert gas and coolant conduits respectively with a source of inert gas and a source of circulating coolant. The interface includes a current coupling arrangement coupled in current directing relationship with the controlled current source and with at least two elongate cables for selection to apply the current source to a select one of the elongate cables. An inert gas valve is provided having an input in gas transfer relationship with the inert gas source and connected with at least two of the elongate conduits and manually actuable to connect the inert gas source with a select one of the elongate inert gas conduits. Further, a coolant valve is provided in fluid transfer relationship with the coolant source and is connected in coolant transfer relationship with at least two elongate conduits and is actuable to connect the coolant source with a select one of the elongate coolant conduits.

Another feature of the invention provides, in an inert gas welding system wherein first and second inert gas welding torches of different configuration are removably connectable by elongate cables at remote coupling ends thereof with a controlled current source located within a cabinet, the first and second torches being removably connectable by elongate cooling conduits at remote coupling ends thereof to receive coolant from a source of coolant, and the first and second torches being removably connectable by elongate inert gas conduits at remote coupling ends thereof to receive inert gas from a source of inert gas, the improved multi-torch interface assembly which comprises an interface housing mountable in adjacency with the cabinet having an outwardly facing control panel with first and second torch assembly ports, each being configured for insertably receiving a coupling end respectively of a cable, a cooling conduit, and an inert gas conduit. First and second current couplers are mounted with the interface housing and extend through the outwardly facing access panel to define respective first and second receptacles and extend inwardly therethrough to define respective first and second electrical connectors electrically coupled with the insertably received coupling ends of the elongate cables connected with the respective first and second torches. A selector cable is provided having one end coupled with the controlled current source at the cabinet and an opposite end configured as a connector manually removably connectable with a select one of the first and second receptacles to supply control current thereto. An inert gas valve is mounted within the interface housing having an input in gas transfer relationship with the inert gas source and first and second selectable gas outputs coupled with the coupling ends of elongate inert gas conduits extending respectively to the first and second torches and manually actuable to select one of the first and second selectable gas outputs. A coolant valve is mounted within the interface housing and has an input in fluid transfer relationship with the coolant source and first and second selectable coolant outputs coupled for directing coolant to the coupling ends of the elongate coolant conduits extending respectively to the first and second torches, and actuable to select one of the first and second selectable coolant outputs.

Another feature of the invention provides a method for inert gas welding a workpiece requiring the utilization of first and second inert gas welding torches of different configuration which are removably connectable by elongate cables with a controlled current source, the first and second torches being removably connectable by elongate coolant conduits for fluid transfer association with a source of coolant, and the first and second torches being removably connectable by elongate inert gas conduits for gas transfer association with a source of inert gas, comprising the steps of:

providing first and second electrical connectors and a selectable electrical input connection from said current source to each thereof adjacent said controlled current source, said first electrical connector being electrically coupled through a said elongate cable with said first torch, said second electrical connector being electrically coupled through a said elongate cable with said second torch;

providing a selectively actuable inert gas valve adjacent said first and second electrical connectors, having an input connected with said inert gas source, having a first output port coupled in gas transfer relationship through a said elongate inert gas conduit to said first torch, and a second output port coupled in gas transfer relationship through a said elongate inert gas conduit to said second torch;

providing a selectively actuable coolant valve adjacent said first and second electrical connectors, having an input connected in fluid transfer relationship with said coolant source, having a first output coupled through a said elongate coolant conduit with said first torch, and a second output coupled through a said elongate coolant conduit with said second torch;

selecting said electrical input connection to said first electrical connector;

actuating said inert gas valve to effect transfer of said inert gas to said first output port;

actuating said coolant valve to effect coolant transfer to said first output;

carrying out a welding procedure on said workpiece with said first torch;

selecting said electrical input connection to said second electrical connector;

actuating said inert gas valve to effect transfer of said inert gas to said second output port;

actuating said coolant valve to effect coolant transfer to said second output; and carrying out a welding procedure on said workpiece with said second torch.

Other objects of the invention will, in part, be obvious and will, in part, appear hereinafter.

The invention, accordingly, comprises the apparatus and method possessing the construction, combination of elements, arrangement of parts and steps which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Industrial inert gas welding requires not only a high level of technology when compared with conventional welding processes, but also draws upon the talents of the artisan. Not only does the qualified inert gas welder require closely regulated current or power sources, but also that artisan, in achieving higher quality welds, must utilize any of a variety of welding torch configurations. The present invention supports the artisan in substantially minimizing the amount of time spent away from welding to set up different configurations of equipment supporting different torch sizes and configurations. In the discourse to follow, the invention initially is described in terms of a retrofitted or adjunct system which may be employed with the somewhat complex and conventionally marketed inert gas welding devices. The description then addresses the incorporation of such improvements integrally within conventionally manufactured welding cabinets.

Figure 1:
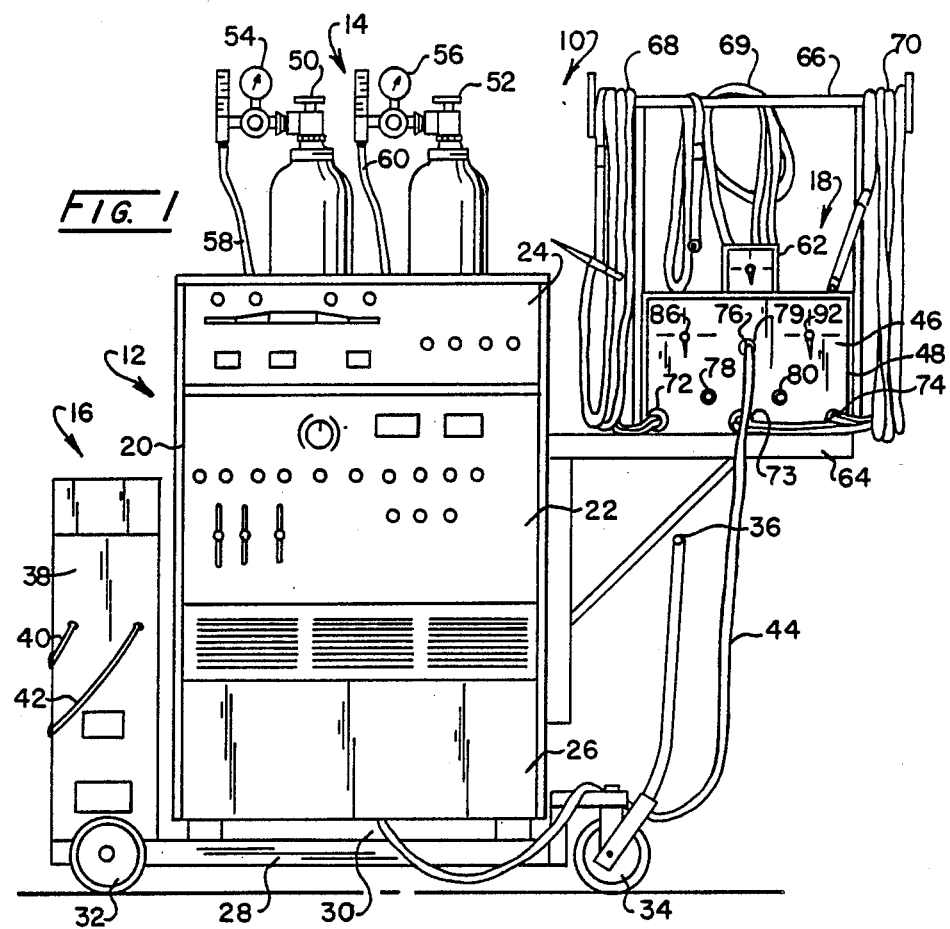
FIG. 1 is a front view of a TIG welding system incorporating a multi-torch interface assembly within a housing located adjacent to a welding cabinet.

Turning to FIG. 1, an inert gas welding system is represented generally at 10. System 10 includes a conventional inert gas welding apparatus represented generally at 12, an inert gas source represented generally at 14, a coolant supply system represented generally at 16, and a retrofit implementation of a multi-torch interface assembly according to the invention represented generally at 18. Welding apparatus 12 may be provided, for example, as a TIG welding system marketed under the trade designation "SYNCHROWAVE 300" by Miller Electric Manufacturing Co. of Appleton, WI. This device 12 includes a metal cabinet 20 which encloses current source control circuitry associated with readouts and regulating knobs and switches controlled, in turn, by the welder at two front face panels 22 and 24. Device 12 develops a carefully controlled current source for the welder's torches and this source is made available at output terminals located behind a lower front facing panel 26. Note that panel 26 is positioned above the structural members of a steel frame 28, so as to provide a slot 30 through which welding cables or assemblies may extend from their interior connections. Frame 30 is seen incorporating ground engaging wheels 32 and 34 along with a conventional guiding handle or yoke 36 permitting a modicum of positioning of the overall apparatus 12. Because TIG type welding processes require the circulation of a coolant through the ports themselves frame 28 also is seen to support an electrically powered water coolant circulator incorporated within a cabinet or housing 38. Other coolant systems are employed by practitioners using various fluids and fluid combinations which may or may not recirculate. Return and supply leads at 40 and 42 are seen extending therefrom to the rearward region of the system 10.

In conventional practice, to change a welding torch size, the artisan welder will be called upon to raise or remove the access panel 26 from cabinet 20 and remove the previously used torch from the power block and sometimes the block itself, attached to the electrode terminal of the power source. This connection typically will include a water supply coupling from the cooling supply 16 as well as a connection with the current source. Further, the coolant return line must be disconnected and, finally, an inert gas input from the inert gas supply port 14 is disconnected. Then, depending upon the rating of the given hand-held torch, a different form or size of power block may be required for connection, coolant flow tubing connections are made, a power coupling connection generally is made with the cooling connection, and the inert gas source 14 is coupled to the torch. Where required, then a protective sheet or jacket is placed around the various conduits leading to the newly-selected torch. The front access panel 26 is replaced and welding can then continue following the somewhat extended interval required for reconfiguring the system 10.

In accordance with the present invention, only a single current source carrying selector cable 44 is seen extending from cabinet 20 through the lower disposed slot 30. In general, the access panel 26 remains in place and the cable 44 is seen extending to the front facing control panel 46 of the assembly 18. This represents the current source input to one of a plurality of individual torch assemblies of different shapes or sizes. Control shapes or panel 46 forms part of interface or torch selector housing 48 which also receives an input from the earlier-described coolant return and supply lines 40 and 42 and from the inert gas source 14. Looking to the latter source 14, two conventional gas retaining cylinders are shown at 50 and 52 each respectively being configured having a regulator assembly as at 54 and 56 which are coupled, in turn, to flexible gas lines 58 and 60. These lines, in particular, are selected by an inert gas type selector valve 62 seen mounted at assembly 18. Typically, the inert gas argon is employed with systems as at 10, however, the welder may be called upon to employ other gases or combinations such as helium or argon-helium. Thus, without some form of selector, further set-up time may be involved in gas conduit connections for a given welding task.

For the retrofit embodiment represented in FIG. 1, the multi-torch interface assembly 18 may conveniently be mounted upon a steel frame 64 which is coupled, in turn, to the cabinet 20 as shown. To support a plurality of torch assemblies, i.e. assemblies including the hand-held torch itself plus the necessary cable and conduiting leading thereto, a supportive rack may be provided as represented at 66 over which the torch assemblies, for example as at 68-70 may be draped. Rack 66 permits a secure retention of the cable and conduiting and torch or torch head which still remains readily accessible to the welder. Note that the cable and conduiting of torch assembly 68 extends from forwardly facing port 72 of panel 46; the corresponding conduiting and cable associated with torch assembly 69 extends from port 73; and the cabling and conduiting making up torch assembly 70 extends from forwardly disposed port 74.

While a wide variety and number of torch assemblies as at 68-70 may be employed with the assembly 18, three are shown in the instant embodiment. A selection of torch heads which may be predetermined as appropriate by the welder may, for example, be a relatively smaller 4 oz., 200 ampere device such as a Model WP-25 marketed by Weldcraft Products, Inc., Florence, SC. Such a device is characterized in having a flexible head making it accessible to the work position in structures representing more difficult welded joints. Similarly, a 7 oz., 350 ampere capacity torch may be additionally located upon the rack 66. In this regard, such a device may be a Model WP-18P which is employed for a variety of mechanized applications and is marketed by Weldcraft Products, Inc. (supra). Further, a larger device, for example a 15 oz., 500 ampere capacity torch may be employed for heavy duty tasks. Such a torch, for example, may be a type WP-12 produced by Weldcraft Products, Inc. (supra).

Figure 2:
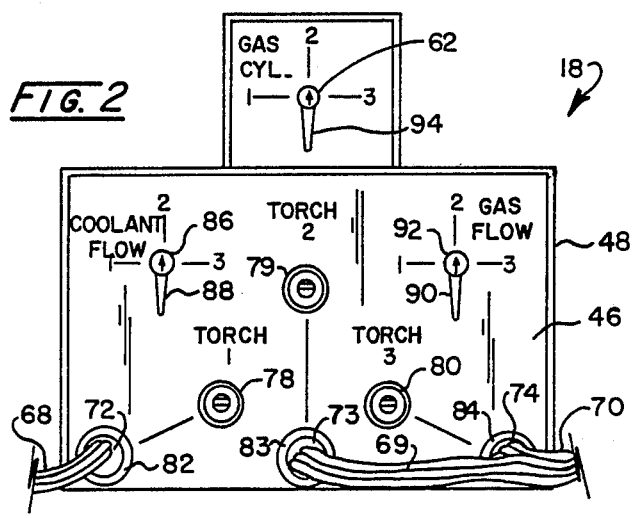
FIG. 2 is a front view of the control panel of the interface assembly shown in FIG. 1.

In altering the system 10 from an operation using one torch assembly to another, the welder need only insert the cable plug connector component 76 coupled to cable 44 into an appropriate electrical receptacle located at the highly convenient control panel 46. For the embodiment illustrated, three such receptacles corresponding with the torch assemblies 68–70 are provided as at 78–80. Note that in FIG. 1, the head or connector 76 of cable 44 is inserted within the current conveying connect-disconnect receptacle 79. Looking additionally to FIG. 2, the forwardly facing implements located at control panel 46, as well as at inert gas type selectors valve 62 are revealed. In the figure, it may be observed that the electrical receptacles 78–80 are identified, respectively, as torch 1–torch 3. Additionally, the ports 72–74 are seen configured having respective grommets 82–84 inserted therewithin to provide protection against abrasive effects and the like otherwise encountered by the surfaces of torch assemblies 68–70. In addition to selecting the current or power input to a desired torch assembly, the welder also hand manipulates a coolant flow valve 86 which is seen to incorporate a hand graspable torch assembly coolant selector component or handle 88 which is hand moved to any of three positions corresponding with the elected torch assembly 68–70. In similar fashion, the welder directs a corresponding inert gas input to the elected torch assembly by manipulating the handle on inert gas selector component 90 of an inert gas valve 92. With the arrangement shown in FIGS. 1 and 2, it may be observed that valves 86 and 92 are positioned to elect torch 2 and the current input has similarly been selected for that position as represented in FIG. 1. Finally, the welder may select a particular form of inert gas from the supply 14 by the manipulation of the handle 94 of inert gas type selector valve 62. In the representation of FIG. 2, it may be observed that handle 94 has elected a gas cylinder as at 50 or 52 which is designated as gas cylinder number 2.

Figure 3:
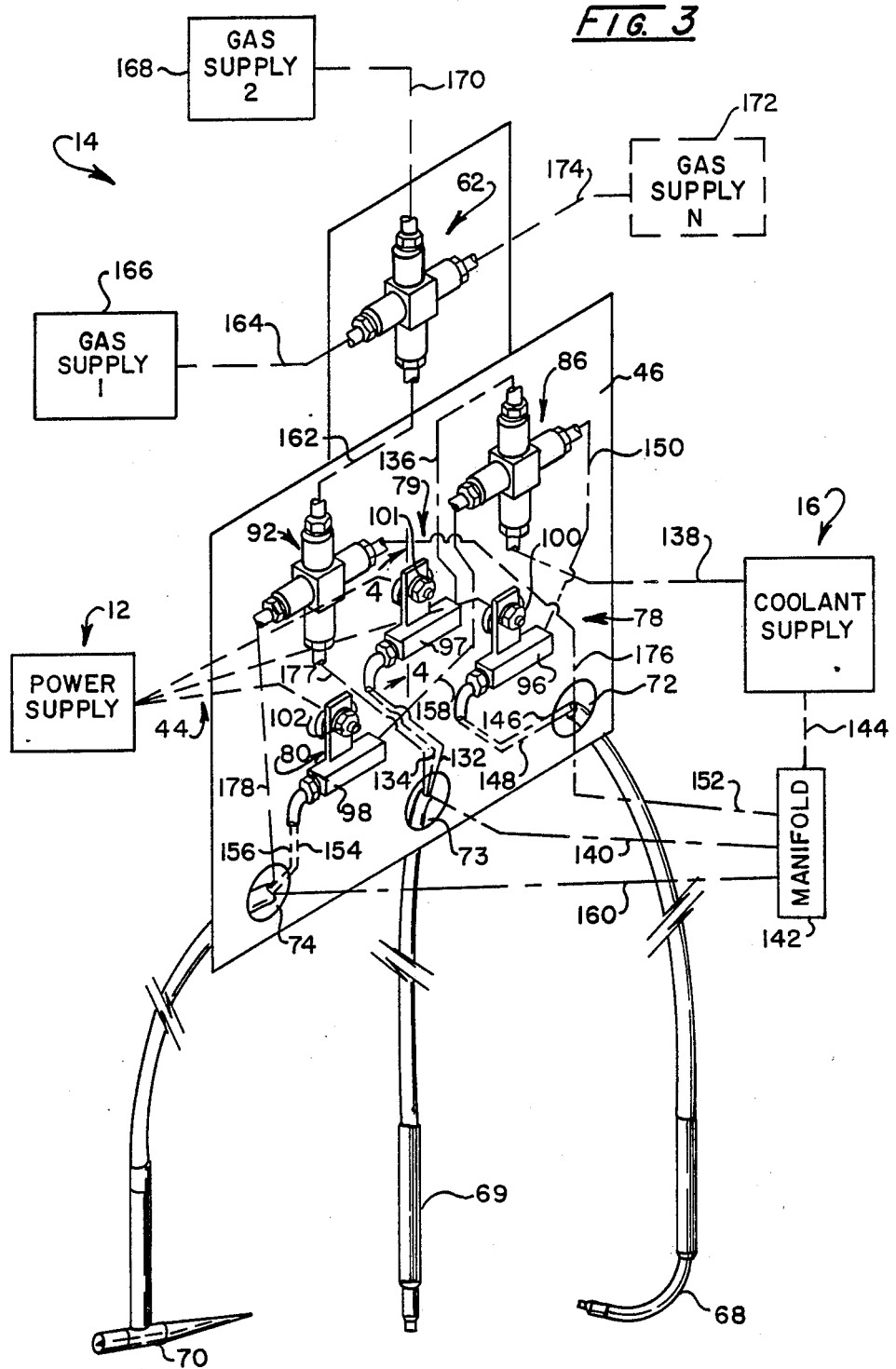
FIG. 3 is a schematic pictorial representation of the internal components of the interface assembly of FIG. 1 looking to the back of its control panel.

Looking in more detail to the current or power input to the assembly 18, cable 44 (FIG. 1) generally may be provided as a #1/0AWG welding cable. The cable 44 contains a lug at one end which is coupled within the cabinet 22 to a welding power source electrode lead. The opposite end of cable 44 as at cable plug 76 is coupled with a female, shielded quick disconnect component which is selectably insertable within a corresponding male component of the receptacle inputs 78–80. These quick disconnect cable plug components as at 76 are rated, for example, at 315 amperes, continuous duty and 550 amperes, intermittent duty, and higher rated connectors are available. Looking to FIG. 3, the receptacles 78–80 are seen in spatial association at the rearwardly disposed side of panel 46 in schematic fashion. In particular, each receptacle 78–80 incorporates a threaded terminal output which serves to electrically connect with a respective electrically conductive power block or electrical connector 96–98. The power blocks 96–98 are retained against respective receptacles 78–80 by hex nut connections as at 100–102. Power blocks 96–98 function to provide a dual purpose unit output of current and coolant which is directed via a combined coolant-current conduit to a coupled torch. The devices vary in configuration both with respect to threaded direction and size, depending upon the particular torch assembly employed. Sometimes referred to as "power cable adapters" the devices are marketed by, for example, Weldcraft Products, Inc. (supra).

Figure 4:
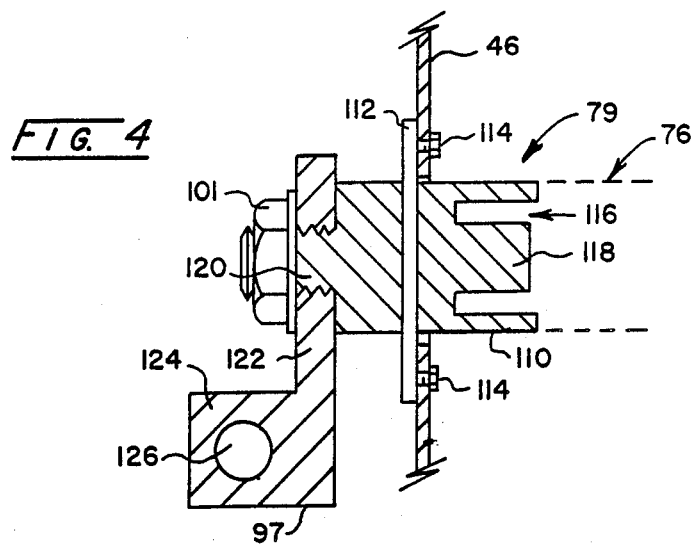
FIG. 4 is a partial sectional view of the current connector taken through the plane 4—4 in FIG. 2.

Turning momentarily to FIG. 4, the assemblage of current coupler or receptacle 79 with cable plug 76 of the cable 44 is revealed. The quick connect-disconnect assemblage comprised of receptacle 79 and cable plug 76 may, for example, be provided as a type J power series marketed by Cam-lok Inc. of Cincinnati, Ohio. In general, the threaded stud-style receptacle 79 will include a unitary molded Neoprene outer sheath 110 which includes an integrally formed mounting block 112 which, in turn, nests against the inwardly-disposed side of panel 46. The device may be retained by screws as at 114. Female cable plug 76 includes a cylindrical female conductive engaging component 116 which mates with a corresponding electrically conductive stud 118 of the receptacle 79. In general, a 90° turn of the cable plug 76 following insertion provides for a locking retention of the device. Receptacle 79 extends to a rearwardly disposed threaded stud portion 120 over which the flange as at 122 of power block 97 may be mounted. Block 97 is retained in position by a hex nut 101. Further, block 97 is seen to extend from its flange component 122 to a body portion 124 which contains appropriate ports as at 126 for coupling with, for example, combined coolant and current carrying cabling as well as with the coolant supply 16. Thus, device 97 provides combined coolant and electrical connector outputs.

Returning to FIG. 3, power block 97 is seen being coupled to the sheathed cabling and conduits of torch assembly 69 by a coolant flow represented at dashed line 132 and a current flow cable input represented by dashed line 134. Coolant input to the power block 97 is depicted as emanating from one output port of coolant flow valve 86 as represented at dashed line 136. Valve 86, in turn, is seen to be fed via dashed line 138 from the coolant supply 16 represented herein in block form. The return for the coolant deriving from torch assembly 69 is represented at dashed line 140 extending from the assembly 69 to an input port of manifold 142 which, in turn, is seen returning via output port line 144 to coolant supply 16.

In similar fashion, the output port of power block 96 is seen providing a current supply and coolant supply via respective lines 146 and 148. Additionally, a coolant input is provided to power block 96 from a next port of coolant flow valve 86, as represented at dashed line 150 extending to block 96. A return then is shown extending from torch assembly 68, as represented by dashed line 152 extending, in turn, to an input port of manifold 142. Finally, the output port of power block 98, associated with receptacle 80 is shown extending to torch assembly 70, as represented at lines 154 and 156. Coolant flow input to the power block 98 is derived from another output port of coolant flow valve 86 as represented at dashed line 158, and a return from the torch assembly 70 is represented by dashed line 160 extending to an input port of manifold 142.

Other torch assembly configurations may be employed. For example, the coolant conduits 140, 152, and 160 can be connected directly to coolant valve 86 so that the coolant is supplied directly to the torch first and returns then may be provided through power cables to power blocks 96-98. Conduits from the power blocks then may be connected to manifold 142. This variation in coolant routing affects none of the switching procedures.

Power supply to the receptacles 78-80 is represented in block form with the common numerical identification 12. Because of the option of the welder to select the appropriate receptacle 78-80 in conjunction with the embodiment of FIGS. 1 and 2, three dashed lines represented at 44 are shown extending to those receptacles 78-80.

Inert gas valve 92 receives an input of inert gas as represented by dashed line 162. This input may be either directly from the inert gas source 14 or through the earlier-noted gas type selector valve 62. In the latter regard, valve 62 is seen receiving one type of inert gas via dashed line 164, the supply input to that line being represented at block 166 labeled "Gas Supply 1". In similar fashion, a second input port to valve 62 is shown receiving a next available inert gas supply as represented at block 168 via dashed line 170. The latter block 168 is seen labeled "Gas Supply 2". Any number of gas supplies may be provided, for example, up to N such supplies as represented by dashed block 172 extending via dashed line 174 to another input port of valve 62. The outputs from inert gas valve 92 (FIG. 2) extend from selected output ports to torch assemblies 68-70 via respective lines 176-178.

Figure 5:
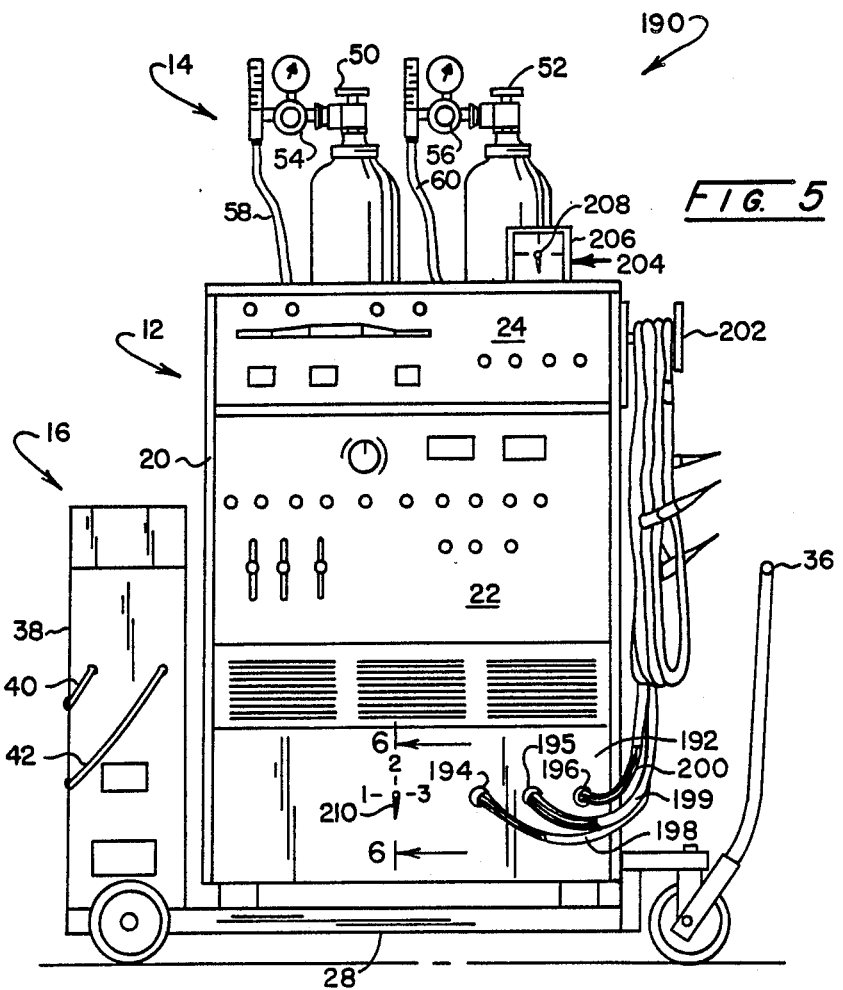
FIG. 5 is an alternative embodiment of the invention wherein the interface assembly is incorporated into the cabinetry of a TIG welding machine.

Referring to FIG. 5, an embodiment of the invention wherein a multi-torch interface assembly is incorporated or integrated within the cabinet 20 of welding apparatus 12 is revealed in general as a system 190. The components of system 190 having a commonality with those described in connection with FIG. 1 are represented in FIG. 5 using the same identifying numeration. However, the interface components earlier described at 18 in FIG. 1 now are incorporated within the cabinet 20 at the lower regions thereof behind a forwardly positioned panel now identified at 192. While the same control panel with associated valving and switching may be employed in conjunction with panel 192, a form of compilation of the functions performed thereby can be achieved. Note in this regard that, as before, three ports are provided. However, these ports are located within panel 192 at ports 194-196 providing for the egress of the cable and conduit assembly of respective torch assemblies 198-200. These assemblies may be conveniently draped upon a rack structure 202 coupled to one side of cabinet 20. As before, a gas type selector valve may be incorporated with the system, here shown at 204 incorporating a small subsidiary housing 206 and hand actuated valve handle or lever 208. Of course, the valve 204 also can be incorporated at the lower panel 192.

Also seen extending through the panel 192 is a multi-position actuating lever 210 which may be utilized in a unitary fashion to select a given one of the torch assemblies 198-200. Provided within the cabinet 20 for the system 190 not only are inputs from the inert gas source 14 but also return and input conduits from the coolant supply 16.

Figure 6:
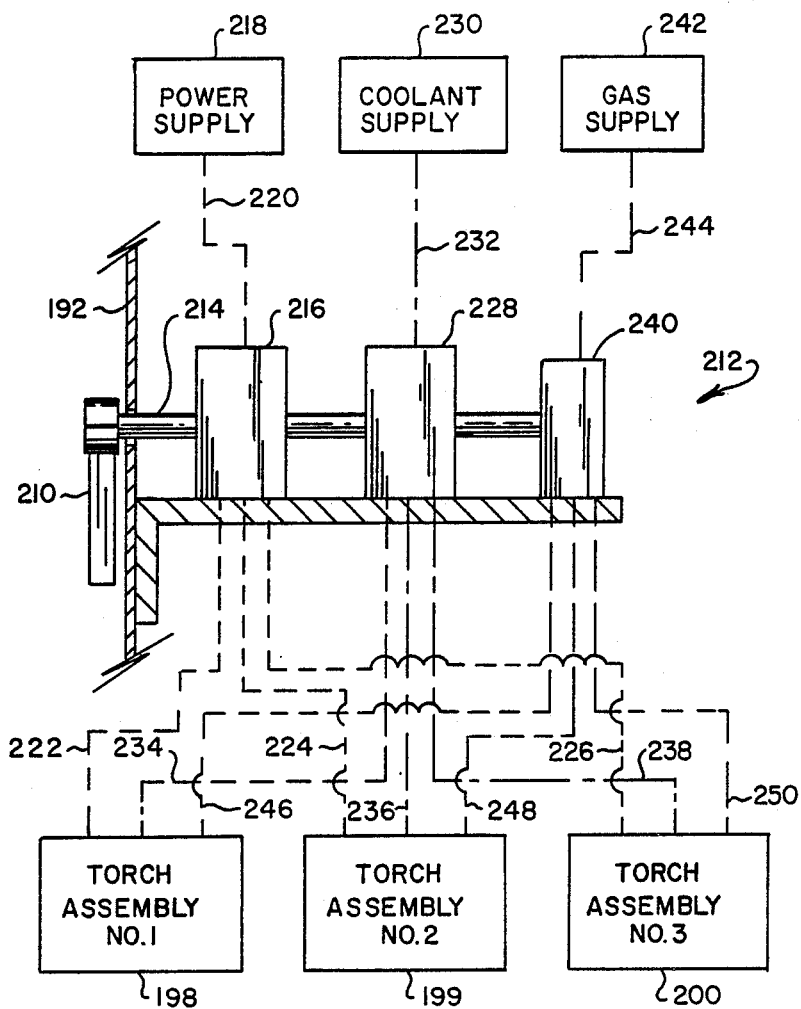
FIG. 6 is a partial sectional view of a single lever actuator taken through the plane 6—6 of FIG. 5, along with block representations of components of a TIG welding system.

Referring to FIG. 6, the combined switching arrangement located behind panel 192 is schematically portrayed and represented in general at 212. Lever 210 is seen to provide a common actuation as represented by master actuator or switching rod 214 to three valving and switching components supported by a bracket 217. In this regard, the rod 214 functions to operate a three position switch represented at block 216. Switch 216 is seen coupled to the controlled current source as represented at block 218 and dashed line 220. The resultant selected output of current developed from the switching function 216 is seen directed to one of the torch assemblies 198-200, now represented in block form with the same numeration. Note that Torch Assembly 198 (No. 1) is seen coupled for receiving current from switch 216 as represented schematically by dashed connector line 222, while torch assembly 199 (No. 2) is seen coupled for receiving current as depicted schematically by dashed line 224 and torch assembly 200 (No. 3) is seen receiving current input as represented schematically by dashed line 226.

Operated in concert with switching function 216 by actuation from lever 210 and coupled actuator rod 214 is coolant supply valve 228. Valve 228 receives a coolant supply input from coolant source 16, herein represented at block 230 and dashed input line 232. The selected output conduit for coolant supply, as developed by actuation of the valve function 228 is represented by dashed line 234 extending to torch assembly 198 (No. 1). A similar output conduit extending to torch assembly 2 at block 199 is represented by dashed line 236 and a third output conduit leading to torch assembly 200 (No. 3) is represented at dashed line 238.

In similar fashion, a second gas valving function is represented at 240 receiving a gas supply as earlier represented at 14 and herein schematically depicted at block 242. This input from the gas supply to valve function 240 is represented at line 244. Gas supply 242 also may, as earlier described, emanate from the selection made by the welder at gas type selector valve 204 (FIG. 5).

The output from gas valving function 240 is represented at dashed line 246 as extending to torch assembly 198 (No. 1); the corresponding output to torch assembly 199 (No. 2) schematically portrayed by dashed line 248; and the output to torch assembly 200 (No. 3) is schematically portrayed by dashed line 250.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. In an inert gas welding system wherein welding torches of varying configuration are removably connectable by an elongate cable with a controlled current source located within a cabinet, and are connectable by elongate inert gas and coolant conduits respectively with a source of inert gas and a source of coolant, the improved multi-torch interface assembly, comprising:

current coupling means coupled in current directing relationship with said controlled current source and with at least two said elongate cables for selection to apply said current source to a select one said elongate cable;

an inert gas valve having an input in gas transfer relationship with said inert gas source and connected with at least two said elongate conduits and actuable to connect said inert gas source with a select one of said elongate inert gas conduits; and a coolant valve in fluid transfer relationship with said coolant source and connected in coolant transfer relationship with at least two said elongate conduits and actuable to connect said coolant source with a select one of said elongate coolant conduits.

2. The multi-torch interface assembly of claim 1 including an inert gas-type selector valve having two input ports, each coupled in gas transfer communication with a unique and select inert gas at said source of inert gas, having an output port coupled in gas transfer communication with said inert gas valve input, and actuable to effect transfer of a said select inert gas to said inert gas valve input.

3. The multi-torch interface assembly of claim 2 in which said inert gas valve is mounted within said interface housing, and including a hand graspable torch assembly inert gas selector component at said control panel, manipulable for effecting said actuation.

4. The multi-torch interface assembly of claim 2 in which said coolant valve is mounted within said interface housing and including a hand graspable torch assembly coolant selector component at said control panel, manipulable for effecting said actuation.

5. The multi-torch interface assembly of claim 2 including a support frame mounted in adjacency with said cabinet for supporting said interface housing, and a rack above said interface housing for retaining said elongate cables and conduits with coupled said torches in draped fashion.

6. The multi-torch interface assembly of claim 2 in which:

each of said torches is coupled with one end of an elongate coolant return conduit having an opposete end;

and including manifold means mounted within said interface housing having an input port coupled with the said opposite end of each said return conduit and an output port coupled, as a coolant return, with said source of coolant.

7. The multi-torch interface assembly of claim 2 in which:

said inert gas valve is mounted within said interface housing, and including a hand graspable torch assembly inert gas selector component at said access panel, manipulable for effecting said actuation; and said coolant valve is mounted within said interface housing and including a hand graspable torch assembly coolant selector component at said access panel, manipulable for effecting said actuation.

8. The multi-torch interface assembly of claim 7 including a support frame mounted in adjacency with said cabinet for supporting said interface housing, and a rack above said interface housing for retaining said elongate cables and conduits with coupled said torches in draped fashion.

9. The multi-torch interface assembly of claim 1 including:

an interface housing positionable adjacent said cabinet and having an outwardly facing control panel; and said current coupling means includes at least two current conveying connect-disconnect receptacles mounted at said outwardly facing control panel and extending within said interface housing, each said receptacle being electrically coupled with a select said welding torch assembly through a said elongate cable, and selector cable means having one end coupled with said controlled current source at said cabinet and an opposite end configured as a connector manually connectable in connect-disconnect mating relationship with said access panel mounted connect-disconnect receptacles.

10. The multi-torch interface assembly of claim 1 in which:

said current coupling means is a multi-position switch actuable by rotation about a given axis;

said inert gas valve is actuable by rotation along said given axis;

said coolant valve is actuable by rotation along said given axis; and including a master actuator extending along said given axis and rotatably actuable to effect simultaneous actuation of said switch, said inert gas valve, and said coolant valve.

11. The multi-torch interface assembly of claim 1 in which:

each of said torches is coupled with one end of an elongate coolant return conduit having an opposite end;

and including manifold means having an input port coupled with the said opposite end of each said return conduit and an output port coupled, as a coolant return, with said source of coolant.

12. In an inert gas welding system wherein first and second inert gas welding torches of different configuration are removably connectable by elongate cables at remote coupling ends thereof with a controlled current source located within a cabinet, said first and second torches being removably connectable by elongate coolant conduits at remote coupling ends thereof to receive coolant from a source of coolant, and said first and second torches being removably connectable by elongate inert gas conduits at remote coupling ends thereof with a source of inert gas, the improved multi-torch interface assembly, comprising:

an interface housing mountable in adjacency with said cabinet and having an outwardly facing control panel with first and second torch assembly ports, each being configured for insertably receiving a said coupling end respectively of a said cable, a said supply conduit, and a said inert gas conduit;

first and second current couplers mounted with said interface housing and extending through said outwardly facing control panel to define respective first and second receptacles and extending inwardly therethrough to define respective first and second electrical connectors electrically coupled with the said insertably received coupling ends of the elongate cables connected with respective said first and second torches;

a selector cable having one end coupled with said controlled current source at said cabinet and an opposite end configured as a connector manually removably connectable with a select one of said first and second receptacles to supply controlled current thereto;

an inert gas valve mounted within said interface housing, having an input in gas transfer relationship with said inert gas source and first and second selectable gas outputs coupled with said coupling ends of elongate inert gas conduits, extending respectively to said first and second torches and actuable to select one of said first and second selectable gas outputs; and a coolant valve mounted within said interface housing, having an input in fluid transfer relationship with said coolant source and first and second selectable coolant outputs coupled for directing coolant to said coupling ends of elongate coolant conduits extending respectively to said first and second torches, and actuable to select one of said first and second selectable coolant outputs.

13. The multi-torch interface assembly of claim 12 wherein said elongate coolant conduits include first and second elongate coolant return conduits coupled with said first and second torches and extending therefrom to respective first and second remote return coupling ends; and including manifold means having an input port coupled with said return coupling ends and an output port coupled, as a coolant return, with said source of coolant.

14. The multi-torch interface assembly of claim 13 in which:
said manifold means is mounted within said interface housing; and
said first and second torch assembly ports are configured for receiving respective said first and second return coupling ends.

15. The multi-torch interface assembly of claim 12 in which said inert gas valve includes an actuator extending through said access panel and manually movable for effecting said actuation.

16. The multi-torch interface assembly of claim 12 in which said coolant valve includes an actuator extending through said access panel and manually movable for effecting said actuation.

17. The multi-torch interface assembly of claim 12 in which:
said elongate cables and elongate coolant conduits are each configured as a dual purpose single unit having dual purpose remote coupling ends;
including first and second power blocks mounted within said interface housing and coupled respectively with said first and second electrical connectors and said coolant valve first and second selectable coolant outputs and having corresponding first and second combined coolant and electrical connector outputs; and
said dual purpose remote coupling ends of said first and second torches are respectively insertably received through said first and second torch assembly ports and are connected respectively with said first and second combined coolant and electrical connector outputs.

18. The multi-torch interface assembly of claim 12 including an inert gas-type selector valve having two input ports, each coupled in gas transfer communication with a unique and select inert gas at said source of inert gas, having an output port coupled in gas transfer communication with said inert gas valve input, and actuable to effect transfer of a said select inert gas to said inert gas valve input.

19. The multi-torch interface assembly of claim 12 including a support frame mounted in adjacency with said cabinet for supporting said interface housing, and a rack above said interface housing for retaining said elongate cables and conduits with coupled said torches in draped fashion.

20. The method for inert gas welding a workpiece requiring the utilization of first and second inert gas welding torches of different configuration which are removably connectable by elongate cables with a controlled current source, said first and second torches being removably connectable by elongate coolant conduits for fluid transfer association with a source of coolant, and said first and second torches being removably connectable by elongate inert gas conduits for gas transfer association with a source of inert gas, comprising the steps of:

providing first and second electrical connectors and a selectable electrical input connection from said current source to each thereof adjacent said controlled current source, said first electrical connector being electrically coupled through a said elongate cable with said first torch, said second electrical connector being electrically coupled through a said elongate cable with said second torch;

providing a selectively actuable inert gas valve adjacent said first and second electrical connectors, having an input connected with said inert gas source, having a first output port coupled in gas transfer relationship through a said elongate inert gas conduit to said first torch, and a second output port coupled in gas transfer relationship through a said elongate inert gas conduit to said second torch;

providing a selectively actuable coolant valve adjacent said first and second electrical connectors, having an input connected in fluid transfer relationship with said coolant source, having a first output coupled through a said elongate coolant conduit with said first torch, and a second output coupled through a said elongate coolant conduit with said second torch;

selecting said electrical input connection to said first electrical connector;

actuating said inert gas valve to effect transfer of said inert gas to said first output port;

actuating said coolant valve to effect coolant transfer to said first output;

carrying out a welding procedure on said workpiece with said first torch;

selecting said electrical input connection to said second electrical connector;

actuating said inert gas valve to effect transfer of said inert gas to said second output port;

actuating said coolant valve to effect coolant transfer to said second output; and carrying out a welding procedure on said workpiece with said second torch.

* * * * *